(12) United States Patent
Wen

(10) Patent No.: US 10,015,307 B2
(45) Date of Patent: Jul. 3, 2018

(54) ELECTRONIC DEVICE AND USAGE CONTROL METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Jun Wen, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/603,420

(22) Filed: May 23, 2017

(65) Prior Publication Data

US 2017/0346941 A1    Nov. 30, 2017

(30) Foreign Application Priority Data

May 27, 2016 (CN) .......................... 2016 1 0360020

(51) Int. Cl.
  *H04M 1/00* (2006.01)
  *H04M 1/725* (2006.01)
(52) U.S. Cl.
  CPC ... *H04M 1/72577* (2013.01); *H04M 1/72569* (2013.01); *H04M 2201/38* (2013.01); *H04M 2201/42* (2013.01); *H04M 2250/12* (2013.01)

(58) Field of Classification Search
  USPC .................................. 455/550.1, 566, 556.1
  See application file for complete search history.

(56) References Cited

U.S. PATENT DOCUMENTS

| | | | | |
|---|---|---|---|---|
| 5,716,273 | A * | 2/1998 | Yuen ....................... | A63F 13/10 348/E5.099 |
| 7,036,145 | B1 * | 4/2006 | Murphy ................... | G09B 7/02 434/169 |
| 9,017,078 | B2 * | 4/2015 | Gross ..................... | G06Q 10/101 434/236 |
| 2003/0189591 | A1 * | 10/2003 | Mo .......................... | G06F 21/34 715/738 |
| 2005/0080898 | A1 * | 4/2005 | Block ............... | G06F 17/30699 709/225 |
| 2006/0136736 | A1 * | 6/2006 | Yang ..................... | G06F 21/316 713/183 |
| 2014/0045157 | A1 * | 2/2014 | Gross ................... | G06Q 10/101 434/236 |
| 2015/0302764 | A1 * | 10/2015 | Gross ................... | G06Q 10/101 434/236 |
| 2017/0140054 | A1 * | 5/2017 | Wu .......................... | G06F 7/02 |
| 2017/0315697 | A1 * | 11/2017 | Jacobson ................. | F24F 11/30 |

* cited by examiner

*Primary Examiner* — Fayyaz Alam
(74) *Attorney, Agent, or Firm* — ScienBiziP, P.C.

(57) ABSTRACT

A usage control method, a usage control system, and an electronic device with usage control function are disclosed. The method includes: obtaining a running usage of the electronic device at first predetermined time periods; determining whether the obtained running usage satisfies a trigger condition relevant to anti-addiction measures; and starting anti-addiction measures when the obtained running usage satisfies the trigger condition.

9 Claims, 5 Drawing Sheets

ELECTRONIC DEVICE AND USAGE CONTROL METHOD

CROSS-REFERENCE TO RELATED APPLICATIONS

This application claims priority to Chinese Patent Application No. 201610360020.9 filed on May 27, 2016, the contents of which are incorporated by reference herein.

FIELD

The subject matter herein generally relates to usage control method and system, and device with usage control function.

BACKGROUND

Smart phone has more and more functions. For example, people can use the smart phone to play games, watch videos, read novels, and so on. Therefore, more and more time is spent on the smart phone, which not only reduces the lifetime of the smart phone, but also is harmful to user's health, for example, vision.

BRIEF DESCRIPTION OF THE DRAWINGS

Implementations of the present disclosure will now be described, by way of example only, with reference to the attached figures.

DETAILED DESCRIPTION

Figure 1:
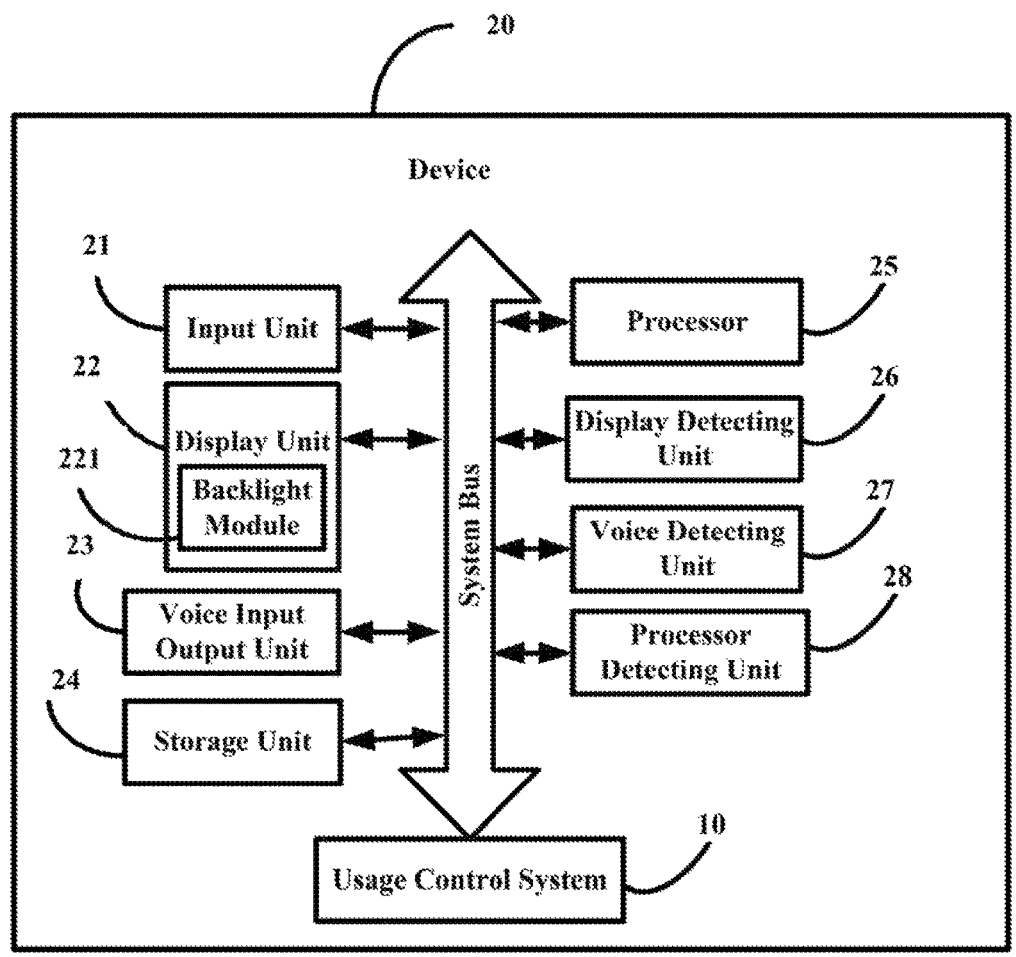
FIG. 1 is a block diagram illustrating an exemplary embodiment of a running environment of a usage control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" exemplary embodiment in this disclosure are not necessarily to the same exemplary embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" indicates "including, but not necessarily limited to"; it specifically indicates open-ended inclusion or membership in a so-described combination, group, series, and the like.

Exemplary embodiments of the present disclosure will be described in relation to the accompanying drawings.

FIG. 1 illustrates an exemplary embodiment of a running environment of a usage control system 10. In the exemplary embodiment, the usage control system 10 is installed and running in an electronic device 20. The electronic device 20 can be, but is not limited to, a smart phone, a tablet, a notebook PC, a desk top PC, a server, and so on. The electronic device 20 can include, but is not limited to, an input unit 21, a display unit 22, a voice input output unit 23, a storage unit 24, and a processor 25. The input unit 21 can receive user's input and generate corresponding data or command. The input unit 21 can be a button, a keyboard, a touch panel, or the like. The display unit 22 can display a user interface, which can include, but is not limited to, data, icons, images, and the like. The display unit 22 includes a backlight module 221. In other exemplary embodiment, the input unit 21 and the display unit 22 can be a touch input screen. The voice input output unit 23 can receive voice input by user and output voice to user. The voice input output unit 23 can be, but is not limited to, microphone, earphone, and so on. The storage unit 24 can be, but is not limited to, an internal storage system, such as a flash memory, a random access memory (RAM) for temporary storage of information, and/or a read-only memory (ROM) for permanent storage of information. The storage unit 24 is configured to store a collection of software instructions of the usage control system 10 and other data. The processor 25 is configured to control the electronic device 20, and execute the usage control system 10. The processor 25 can be, but is not limited to, a central processing unit, a digital signal processor, or a single chip, for example.

In the exemplary embodiment, the electronic device 20 further includes a display detecting unit 26, a voice detecting unit 27, and a processor detecting unit 28. The display detecting unit 26 is configured to detect a working duration of the display unit 22. In the exemplary embodiment, the display detecting unit 26 detects a lighten duration of the backlight module 221 to detect the working duration of the display unit 22. The voice detecting unit 27 is configured to detect a working duration of the voice input output unit 23. In the exemplary embodiment, the voice detecting unit 27 can be a voice sensor. The processor detecting unit 28 is configured to detect a running temperature of the processor 25. In the exemplary embodiment, the processor detecting unit 28 can be a temperature sensor.

In the exemplary embodiment, the usage control system 10 obtains running usage of the electronic device 20 at predetermined time periods, and determines whether the obtained running usage satisfies a trigger condition relevant to anti-addiction measures. When the obtained running usage satisfies the trigger condition, the usage control system 10 starts anti-addiction measures. The running usage can be indicated by one or more of the working duration of the display unit 22, the working duration of the voice input output unit 23, and the running temperature of the processor 25. For simplicity, the running usage is represented as "F", the working duration of the display unit 22 is represented as "A", the working duration of the voice input output unit 23 is represented as "B", and the running temperature of the processor 25 is represented as "C". According, "F" can be represented by a correlation function of "A", "B", and "C".

In an exemplary embodiment, the running usage is indicated by one of the working duration of the display unit 22, the working duration of the voice input output unit 23, and the running temperature of the processor 25. For example, the running usage is indicated by the working duration of the display unit 22, namely, "F=f(A)", or the running behavior can be indicated by the working duration of the voice input output unit 23, namely "F=f(B)", or the running usage is indicated by the running temperature of the processor 25, namely "F=f(C)". In the exemplary embodiment, when the running usage is indicated by the working duration "A" of the display unit 22, the trigger condition can be that the working duration "A" of the display unit 22 is greater than a first predetermined threshold, for example, 60 minutes. When the running usage is indicated by the working duration "B" of the voice input output unit 23, the trigger condition can be that the working duration "B" of the voice input output unit 23 is greater than a second predetermined threshold, for example, 30 minutes. When the running usage is indicated by the running temperature "C" of the processor 25, the trigger condition can be that the running temperature "C" of the processor 25 is greater than a third predetermined threshold, for example, 70° C.

In another exemplary embodiment, the running usage can be indicated by two values out of the three values of the working duration of the display unit 22, the working duration of the voice input output unit 23, and the running temperature of the processor 25. For example, the running usage is indicated by the working duration of the display unit 22 and the working duration of the voice input output unit 23 together, namely, "F=f(A, B)", or, the running usage is indicated by the working duration of the display unit 22 and the running temperature of the processor 25 together, namely "F=f(A, C)", or the running usage is indicated by the working duration of the voice input output unit 23 and the running temperature of the processor 25 together, namely "F=f(B, C)". In the exemplary embodiment, when the running usage is indicated by the working duration A of the display unit 22 and the running temperature of the processor 25, the trigger condition can be that the working duration "A" of the display unit 22 is greater than a fourth predetermined threshold (e.g., 45 minutes) and the running temperature of the processor 25 is greater than a fifth threshold (e.g., 70° C.).

In further exemplary embodiment, the running usage is indicated by the working duration of the display unit 22, the working duration of the voice input output unit 23, and the running temperature of the processor 25 all being taken together. Thus, the running usage can be "F=f(A, B, C)". In the exemplary embodiment, when the running behavior "F" is indicated by the working duration "A" of the display unit 22, the working duration "B" of the voice input output unit 23, and the running temperature of the processor 25, the trigger condition can be that any of "A", "B", "C" is greater than a corresponding predetermined threshold.

Figure 2:
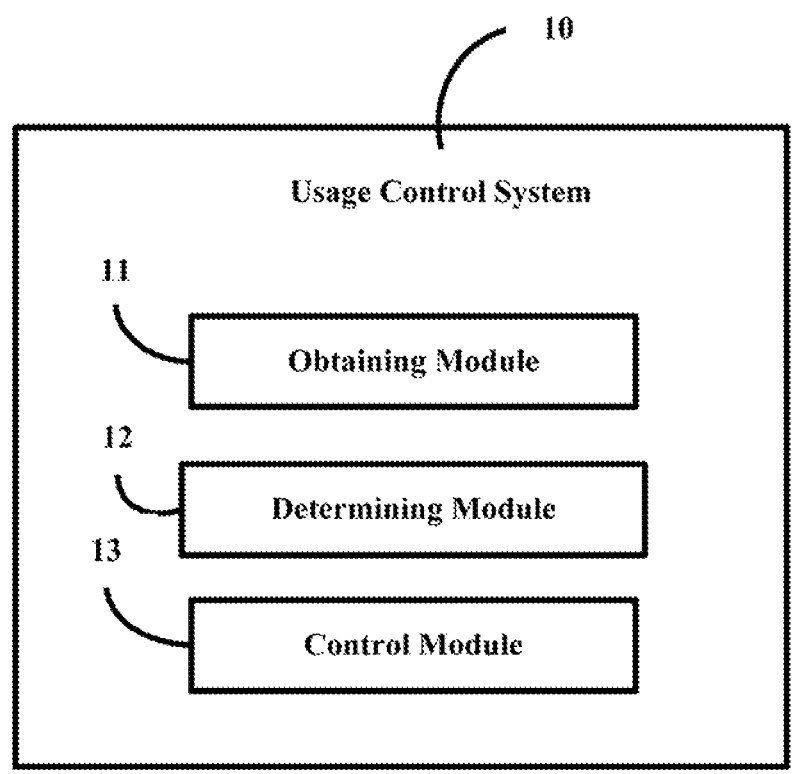
FIG. 2 is a block diagram of an exemplary embodiment of the usage control system of FIG. 1.

Referring to FIG. 2, the usage control system 10 includes a number of modules which are a collection of software instructions which can be executed by the processor 25. In the exemplary embodiment, the number of modules include an obtaining module 11, a determining module 12, and a control module 13, illustrated in FIGS. 3 and 5.

Figure 3:
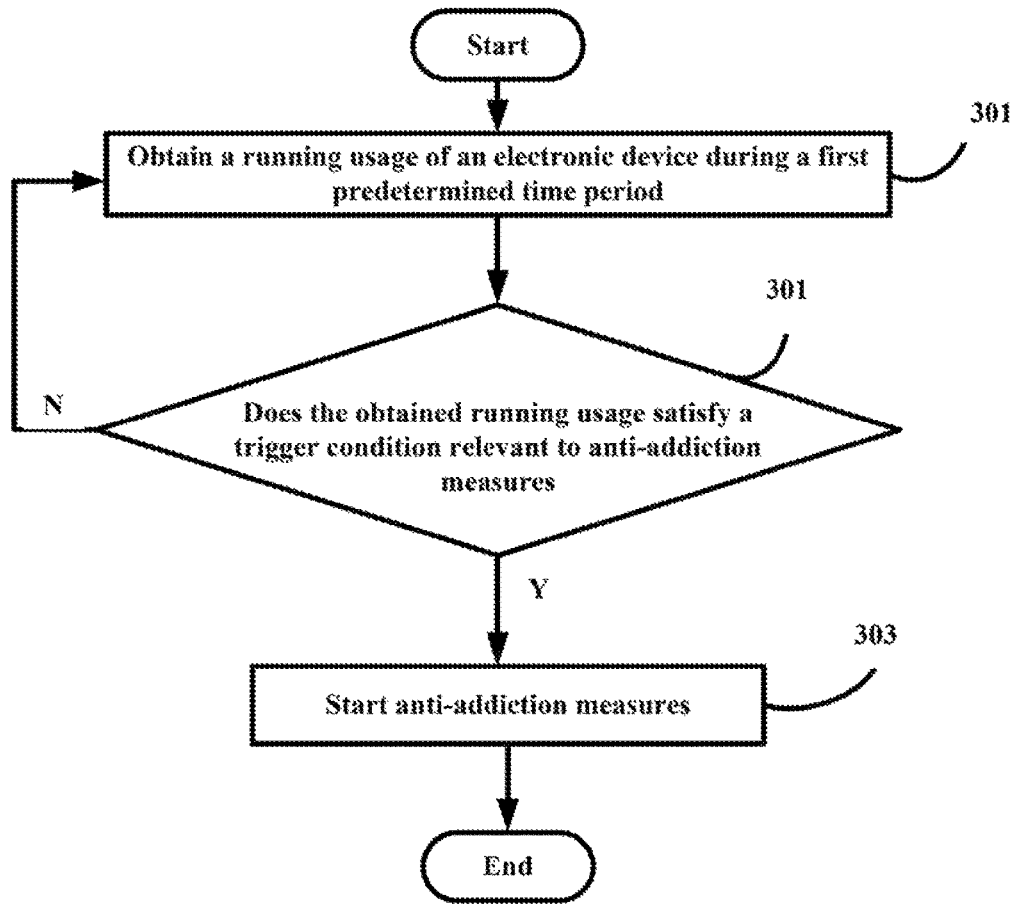
FIG. 3 is a flowchart illustrating an exemplary embodiment of a usage control method.

FIG. 3 illustrates an exemplary embodiment of a flowchart of a usage control method. The exemplary method 300 is provided by way of example, as there are a variety of ways to carry out the method. The method 300 described below can be carried out using the configurations illustrated in FIG. 1, for example, and various elements of these figures are referenced in explaining exemplary method 300. Each block shown in FIG. 3 represents one or more processes, methods, or subroutines, carried out in the exemplary method 300. Additionally, the illustrated order of blocks is by way of example only and the order of the blocks can be changed according to the present disclosure. The exemplary method 300 can begin at block 301. Depending on the exemplary embodiment, additional steps can be added, others removed, and the ordering of the steps can be changed.

At block 301, an obtaining module 11 obtains a running usage of an electronic device 20 during a first predetermine time period.

In the exemplary embodiment, the running usage can be indicated by one or more of a working duration of a display unit 22, a working duration of a working duration of a voice input output unit 23, and a running temperature of a processor 25.

At block 302, a determining module 12 determines whether the obtained running usage satisfies a trigger condition relevant to anti-addiction measures. If the obtained running usage satisfies the trigger condition, the process goes to block 303, otherwise, the process goes to block 301. In the exemplary embodiment, the trigger condition can be preset by user or a system default.

At block 303, a control module 13 activates anti-addiction measures.

Figure 4:
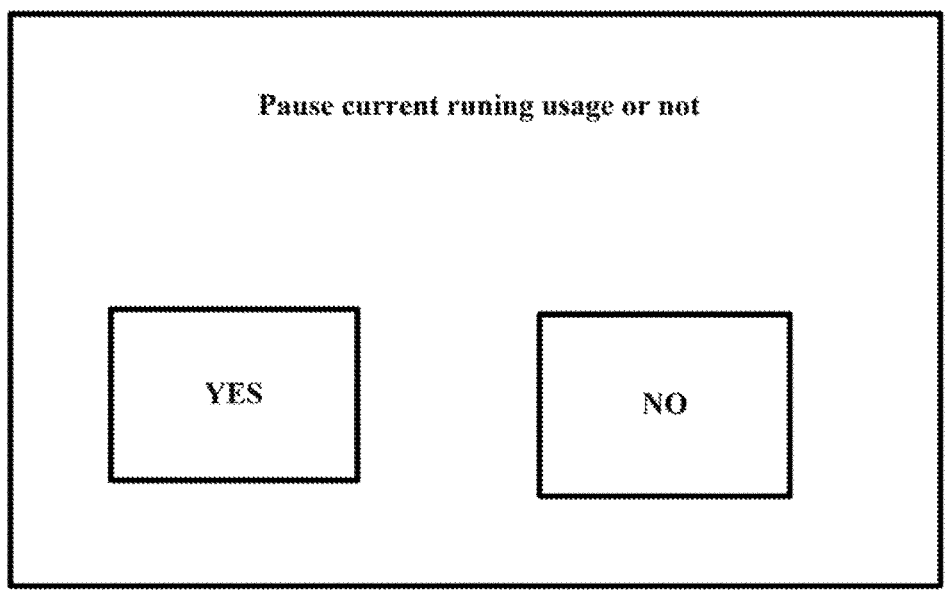
FIG. 4 is a schematic view illustrating an exemplary embodiment of a prompt interface displayed in an electronic device of FIG. 1.

In exemplary embodiment, the control module 13 generates a prompt interface to prompt the user to pause the current running usage of the electronic device 20 and displays the prompt interface on the display unit 22. Referring to FIG. 4, the prompt interface includes at least two options, for example, a "YES" option, which indicates the user continues the current running usage on the electronic device 20, and a "NO" option, which indicates the user pauses the current running usage on the electronic device 20. In other exemplary embodiment, the prompt interface further includes a delay option, which indicates the user will delay to pause the current running usage on the electronic device 20.

Figure 5:
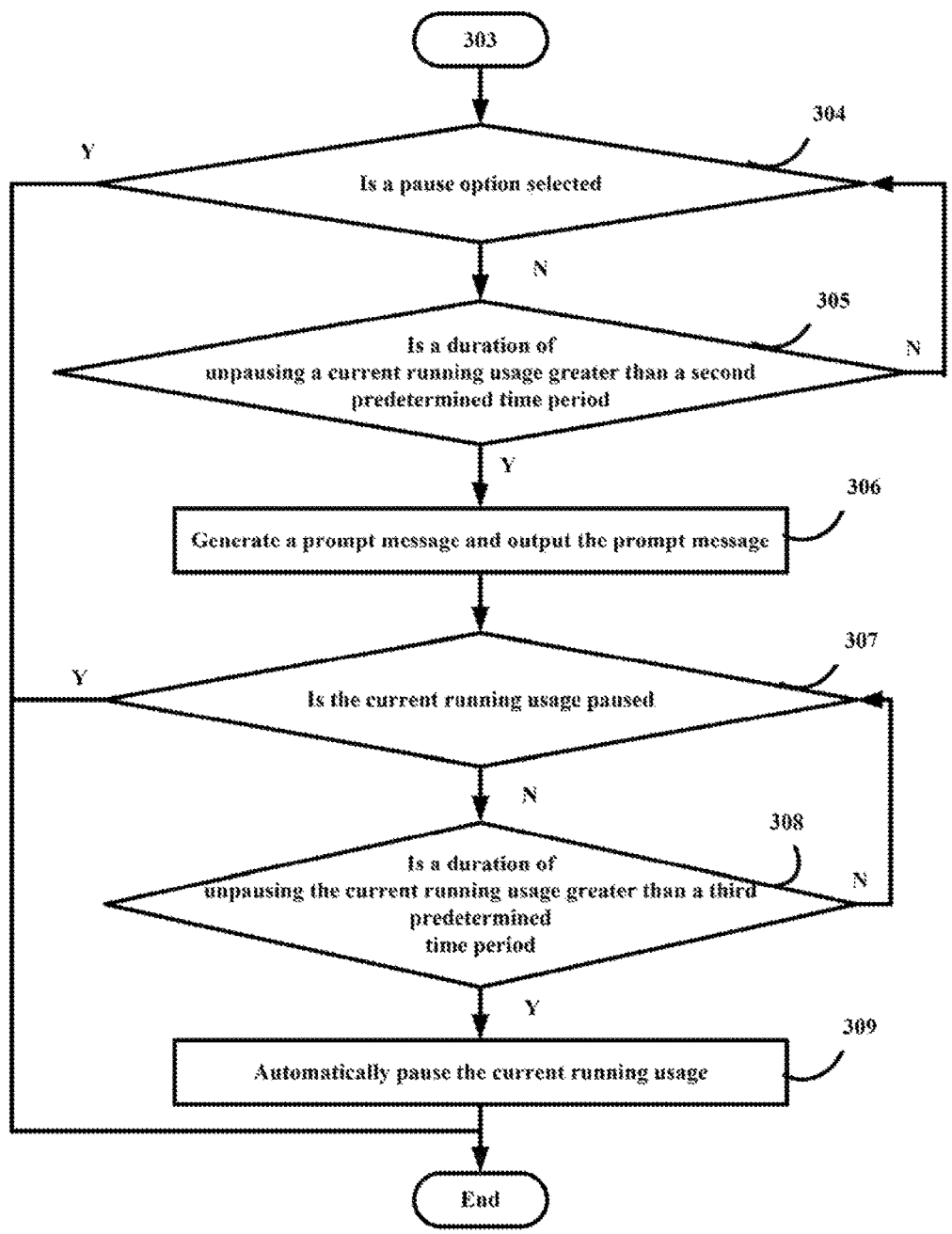
FIG. 5 is a flowchart illustrating another exemplary embodiment of a usage control method after block 303 of FIG. 3.

Referring to FIG. 5, a flowchart of the usage control method after block 303 of FIG. 3 is illustrated. At block 304, a determining module 12 determines whether a pause option, namely, a "YES" option displayed in the prompt interface, is selected. When the "YES" option is selected, the process is end, when the "NO" option is selected, the process goes to block 305.

At block 305, the obtaining module 11 obtains a duration of un-pausing the current running usage on the electronic device 20, and the determining module 12 determines whether the obtained duration is greater than a second predetermined time period. When the obtained duration is greater than the second predetermined time period, the process goes to block 306, otherwise, the process goes to block 304.

At block 306, the control module 13 generates a prompt message and outputs the generated prompt message through the voice input output unit 23.

At block 307, the determining module 12 determines whether the current running usage of the electronic device 20 is paused. That is, the determining module 12 determines whether the user responds the prompt message to pause the current running usage on the electronic device 20. When the current running usage of the electronic device 20 is paused, the process is end, otherwise, the process goes to block 308.

At block 308, the obtaining module 11 obtains a duration of un-pausing the current running usage of the electronic device 20, and the determining module 12 determines whether the obtained duration is greater than a third predetermined time period. When the obtained duration is greater than the third predetermined time period, the process goes to block 309, otherwise, the process goes to block 307.

At block 309, the control module 13 pauses the current running usage of the electronic device 20. For example, the control module 12 locks the electronic device 20, or shuts off the electronic device 20.

In the exemplary embodiment, supposed the electronic device 20 is a smart phone, and the user is reading novels on the smart phone, the determining module 12 determines whether a working duration of the backlight module 221 is greater than a predetermined threshold, for example, 30 minutes. When the working duration of the backlight module 221 is greater than the predetermined threshold, 30 minutes, the control module 13 controls the display unit 22 to display the prompt interface to prompt the user to pause reading behavior. That is, the prompt interface displays a "YES" option which indicates the user pauses the reading behavior, a "NO" option which indicates the user continues the reading behavior. When the user selects the "NO" option, the display unit 22 is still lighten, the obtaining module 11 obtains the working duration of the display unit 22 is greater than a second predetermined threshold, for example, 40 minutes, the control module 13 generates a prompt message and outputs the generated prompt message, for example, "you read too long time, you have to have a rest now". When the user ignores the prompt message, and does not pause the reading behavior, the obtaining module 11 obtains the working duration of the display unit 22, and the determining module 12 determine whether the obtained working duration is greater than a third threshold, for example, 45 minutes. When the obtained working duration is greater than the third threshold, the control module 13 powers off the display unit 22.

By utilizing the usage control system and method, the running usage of the electronic device 20 is obtained, and a usage on the electronic device 20 can be controlled when the running usage satisfies a trigger condition for stating anti-addiction measures. Further, when the usage on the electronic device is greater than a predetermined value, a prompt message is generated to prompt the user to have a rest. Moreover, when the usage on the electronic device is greater than the predetermined value and the user ignores the prompt message and continues using the electronic device 20, the usage control system and method can automatically power off the electronic device 20 to make the user have a rest.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A usage control method comprising:
 obtaining a running usage of an electronic device at first predetermined time periods, wherein the running usage of the electronic device comprises a working duration of a display unit of the electronic device;
 determining whether the obtained running usage satisfies a trigger condition relevant to anti-addiction measures; and
 starting anti-addiction measures when the obtained running usage satisfies the trigger condition;
 wherein the running usage of the electronic device further comprises a working duration of a voice input output unit of the electronic device, and a running temperature of a processor of the electronic device.

2. The usage control method of claim 1, wherein step of starting anti-addiction measures further comprises:
 generating a prompt interface to prompt a user to pause the current running usage of the electronic device and displaying the generated prompt interface on the display unit.

3. The usage control method of claim 2, further comprising:
 determining whether the running usage of the electronic device is paused;
 obtaining a duration of the running usage of the electronic device when the running usage of the electronic device is not paused, and determining whether the obtained duration of the running usage is greater than a second predetermined time period; and
 generating a prompt message and outputting the generated prompt message when the obtained duration of the running usage is greater than the second predetermined time period.

4. The usage control method of claim 3, further comprising:
 determining whether the running usage of the electronic device is paused after the prompt message is displayed;
 obtaining the duration of the running usage of the electronic device when the running usage of the electronic device is not paused after the prompt message is displayed, and determining whether the obtained duration of the running usage is greater than a third predetermined time period; and
 pausing the running usage of the electronic device when the obtained duration is greater than the third predetermined time period.

5. A non-transitory storage medium having instructions stored thereon that, when executed by a processor of an electronic device, cause the processor to perform a usage control method, wherein the method comprises:
 obtaining a running usage of an electronic device at first predetermined time periods, wherein the running usage comprises a working duration of a display unit of the electronic device;
 determining whether the obtained running usage satisfies a trigger condition relevant to anti-addiction measures; and
 starting anti-addiction measures when the obtained running usage satisfies the trigger condition;

wherein the running usage of the electronic device further comprises a working duration of a voice input output unit of the electronic device, and a running temperature of a processor of the electronic device.

6. An electronic device with a usage control function, comprising:
- a display unit;
- a voice input output unit;
- a processor; and
- a storage unit storing one or more programs, when executed by the processor, the one or more programs cause the processor to:
  - obtain a running usage of the electronic device at predetermined time periods, wherein the running usage of the electronic device comprises a working duration of the display unit;
  - determine whether the obtained running usage satisfies a trigger condition relevant to anti-addiction measures; and
  - start the anti-addiction measures when the obtained running usage satisfies the trigger condition;
- wherein the running usage of the electronic device further comprises a working duration of a voice input output unit of the electronic device, and a running temperature of a processor of the electronic device.

7. The non-transitory storage medium of claim 5, wherein step of starting anti-addiction measures further comprises:
- generating a prompt interface to prompt a user to pause the current running usage of the electronic device and displaying the generated prompt interface on the display unit.

8. The non-transitory storage medium of claim 7, further comprising:
- determining whether the running usage of the electronic device is paused;
- obtaining a duration of the running usage of the electronic device when the electronic device in the running usage is not paused, and determining whether the obtained duration of the running usage is greater than a second predetermined time period; and
- generating a prompt message and outputting the generated prompt message when the obtained duration of the running usage is greater than the second predetermined time period.

9. The non-transitory storage medium of claim 8, further comprising:
- determining whether the running usage of the electronic device is paused after the prompt message is displayed;
- obtaining the duration of the running usage of the electronic device when the electronic device in the running usage is not paused after the prompt message is displayed, and determining whether the obtained duration of the running usage is greater than a third predetermined time period; and
- pausing the running usage of the electronic device when the obtained duration is greater than the third predetermined time period.

* * * * *